Feb. 16, 1926.
M. OSNOS
1,573,789
TRANSMITTING ARRANGEMENT FOR WIRELESS SIGNALING
Filed July 11, 1923
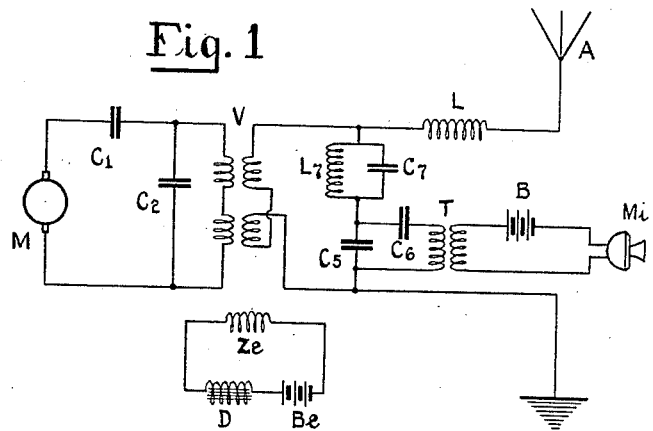
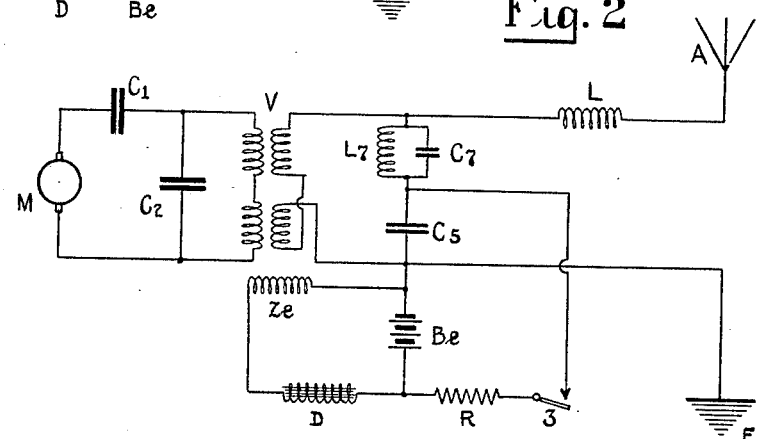
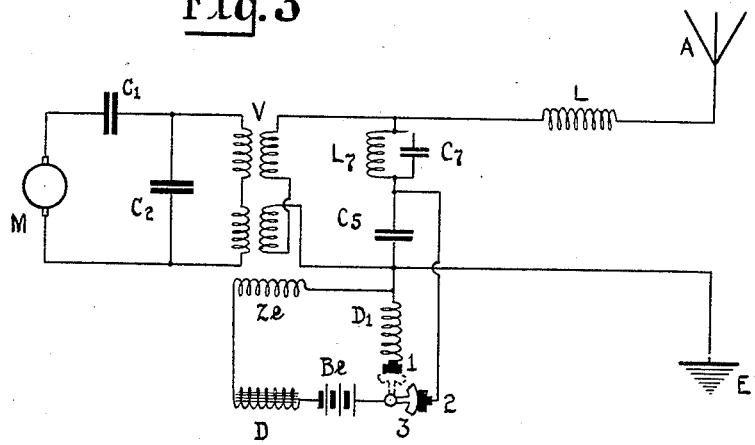
Inventor
MENDEL OSNOS
By his Attorney Patented Feb. 16, 1926.

1,573,789

UNITED STATES PATENT OFFICE.

MENDEL OSNOS, OF BERLIN, GERMANY, ASSIGNOR TO GESELLSCHAFT FÜR DRAHTLOSE TELEGRAPHIE M. B. H. HALLESCHES, OF BERLIN, GERMANY, A CORPORATION OF GERMANY.

TRANSMITTING ARRANGEMENT FOR WIRELESS SIGNALING.

Application filed July 11, 1923. Serial No. 650,861.

*To all whom it may concern:*

Be it known that I, MENDEL OSNOS, a citizen of Russia, residing at Hallesches Ufer 12/13, Berlin, S. W. 11, Germany, have invented new and useful Improvements in Transmitting Arrangements for Wireless Signaling (for which I have filed application in Germany, Serial No. 57,234 on August 8, 1922), of which the following is a specification accompanied by drawings.

Transmitting arrangements for wireless signaling are known in which the magnetic saturation of a static frequency transformer or changer is altered in accordance with the signals, or in the case of telephony, with the speech-oscillations.

These alterations of the magnetic saturation are produced in wireless telegraphy by direct current and in telephony by a current having the speech oscillations impressed upon it, and this current is passed through a special controlling winding of the transformer.

Further, it is known that this controlling winding can be combined with the secondary winding of the frequency transformer, but it must be observed that the current which is of the frequency desired to be utilized and which is produced in the secondary winding of the transformer and supplied to the aerial should not be allowed to pass into the controlling circuit. For this purpose, a special choke coil which opposes a considerable resistance to current of the operative frequency has heretofore been put into the controlling circuit.

According to the invention, the necessity of employing a choke coil in the controlling circuit can be obviated by connecting the circuit containing the controlling means, that is, the sending key, microphone transformer, etc. in parallel with a condenser and in series with a special protecting circuit, such as is used for preventing the passage of the undesired harmonics to the aerial. Such protecting circuits are, for instance, described in German Patent No. 310,731 and consist of inductive and capacitive branches, the values of which are so chosen that for current of the operative frequency, the inductive reactance of the one branch is equal to the capacitive reactance of the other. If such a protecting circuit is connected in parallel with the secondary winding of the transformer supplying the aerial with current, it constitutes, on the one hand, a high impedance for currents of the operative frequency, so that these cannot be withdrawn from the aerial. On the other hand, however, its capacitive branch opposes only a low impedance to the harmonics, which are in this way kept off from the aerial. As the currents of the operative frequency cannot pass through the above-mentioned protecting circuit, the branch which contains the controlling means can without danger be connected to this protecting circuit without a special choke coil. The currents of higher frequency then pass through the condenser of the protecting circuit and the condenser in parallel with the controlling means.

In the drawing,

Fig. 1 is a diagrammatic representation of a circuit arrangement embodying the invention and arranged for telephony; and Figs. 2 and 3 are modified forms of the invention arranged for telegraphy.

In the form of the invention shown in Fig. 1, M is the high frequency generator, $C_1$ and $C_2$ are tuning condensers, V is a static frequency transformer, Ze is its direct current exciting winding which is supplied with current by the battery Be through a choke coil D preferably having an iron core, A the aerial and L its loading coil. The protecting circuit consisting of an inductance $L_7$ and a capacity $C_7$, keeps off the undesired harmonics from the aerial and is tuned in such a way, that waves of the operative frequency cannot pass through it. According to the invention, the secondary winding of the microphone transformer T, the primary winding of which is connected in series with a battery B and a microphone Mi is connected in parallel with the condenser $C_5$. The circuit containing the condenser $C_5$, the secondary of transformer T and, if desired, a second condenser $C_6$ in series is inserted in series with the protecting circuit $L_7$, $C_7$. The condenser $C_5$ is so chosen that it constitutes only a low reactance for the higher harmonics passing through the condenser $C_7$, and therefore keeps them off from the telephone transformer T. The condenser $C_6$ is so chosen that the whole controlling circuit including the secondary winding of V the protecting circuit $L_7$, $C_7$ and condenser $C_5$ is tuned to the mean frequency of the telephone currents.

In the arrangement for wireless telegraphy, shown in Fig. 2, a sending key 3 and a series rheostat R are connected in series with the protecting circuit, $L_7$, $C_7$, and the secondary winding of V and parallel to the condenser $C_5$. The sending key circuit is preferably supplied with current by the same battery Be which supplies the magnetizing direct current winding Ze.

If the arrangement of the sending key is such as shown in Fig. 3, the frequency transformer V is excited only by the direct current winding Ze when key 3 touches the contact 1 but when the key touches the contact 2, the direct current passes not only through the winding Ze, but also through the secondary winding of V, and thereby the magnetic saturation is altered. In order that the direct current flowing through the winding Ze shall not be interrupted, both contacts 1 and 2 are simultaneously touched by the key 3 when it is between them.

It is desirable to make the inductive resistance of the choke coil $D_1$ equal to that of the sending key circuit, to the end that the current passing through choke coil D and winding Ze will be altered as little as possible in signaling.

Having described my invention, what I claim is:

1. A transmitting arrangement for wireless signaling comprising a high frequency generator, a static frequency transformer having its input circuit arranged in circuit with the generator, an aerial circuit coupled with the output circuit of the transformer, a parallel circuit connected with the aerial circuit and arranged in parallel with said output circuit, said parallel circuit comprising a protecting circuit and a condenser arranged in series, a circuit arranged in parallel with said condenser, and means for controlling the current in the last-mentioned circuit.

2. A signaling arrangement comprising a high frequency generator, a static frequency transformer having its input circuit arranged in circuit with the generator, a transmission circuit coupled with the output circuit of the transformer, a parallel circuit coupled with said transmission circuit and arranged in parallel with said output circuit, said parallel circuit comprising a loop circuit and a condenser in series, said loop circuit being tuned to the operative frequency of said transmission circuit and comprising inductance and capacity branches arranged in parallel with each other, a circuit arranged in parallel with said condenser, and means for controlling the current in the last-mentioned circuit.

3. A signaling arrangement comprising a high frequency generator, a static frequency transformer having its primary arranged in circuit with the generator, a transmission circuit connected with the secondary of the transformer, a parallel circuit arranged in parallel with the secondary of the transformer, said parallel circuit comprising a loop circuit having inductance and capacity branches, and a condenser arranged in series with said loop circuit, a circuit arranged in parallel with said condenser, a winding for energizing the transformer, and common means for supplying current to said winding and to the last-mentioned circuit.

4. A signaling arrangement comprising a high frequency generator, a static frequency transformer having its primary arranged in circuit with the generator, a transmission circuit connected with the secondary of the transformer, a parallel circuit arranged in parallel with the secondary of the transformer, said parallel circuit comprising a protecting device and a condenser arranged in series, a second circuit arranged in parallel with said condenser, a sending key in said second circuit, a winding for energizing the transformer, a third circuit containing said winding and arranged in parallel with said second circuit, and common direct current supplying means for said second and third circuits.

5. A signaling arrangement comprising a high frequency generator, a static frequency transformer having its primary arranged in circuit with the generator, a transmission circuit connected with the secondary of the transformer, a parallel circuit arranged in parallel with the secondary of the transformer, said parallel circuit comprising a protecting device and a condenser arranged in series, a second circuit arranged in parallel with said condenser, an ohmic resistance and a sending key in said second circuit, a winding for energizing the transformer, a third circuit containing said winding, and common direct current supplying means for said second and third circuits.

6. In combination, a source of high frequency energy, a static frequency changer having its input circuit arranged in circuit with said source, a transmitting means including a circuit tuned to the desired harmonic coupled to the output circuit of said changer, signal means including a signal device for causing a signal to be impressed on the desired harmonic of said changer, and a common means for keeping undesired harmonics from said transmitting means and for protecting said signal device from the desired harmonic.

7. In combination, a source of high frequency energy, a static frequency changer having its input circuit arranged in circuit with said source, an antenna circuit tuned to the desired harmonic and coupled to the output circuit of said changer, signal means including a signal device for causing a signal to be impressed on the desired harmonic of said changer, and common means for keeping undesired harmonics from said antenna circuit and for protecting said signal device from the desired harmonic.

8. In combination, a source of high frequency energy, a static frequency changer having its input circuit arranged in circuit with said source, transmitting means including a circuit tuned to the desired harmonic coupled to the output circuit of said changer, signal means including a signal device for causing a signal to be impressed on the desired harmonic of said changer by varying its magnetic condition, and common means for keeping undesired harmonics from said transmitting means and for protecting said signal device from the desired harmonic.

9. In combination, a source of desired and undesired harmonics, transmitting means including a circuit tuned to the desired harmonic, signal means including a signal device for causing a signal to be impressed on the desired harmonic, and a common means for keeping undesired harmonics from said transmitting means and for protecting the said signal device from the desired harmonic.

MENDEL OSNOS.